(12) United States Patent
Berlik et al.

(10) Patent No.: US 8,191,044 B1
(45) Date of Patent: May 29, 2012

(54) SYSTEM AND METHOD FOR MAINTAINING REQUIREMENTS TRACEABILITY

(75) Inventors: Jae Wu Berlik, Leesburg, VA (US); Sachin Dharmadhikari, Vienna, VA (US); Matthew Luis Harding, Laurel, MD (US); Naresh Singh, Fairfax, VA (US)

(73) Assignee: Fannie Mae, Washington, DC (US)

( * ) Notice: Subject to any disclaimer, the term of this patent is extended or adjusted under 35 U.S.C. 154(b) by 1434 days.

(21) Appl. No.: 11/789,539

(22) Filed: Apr. 25, 2007

Related U.S. Application Data

(60) Provisional application No. 60/874,888, filed on Dec. 14, 2006.

(51) Int. Cl.
*G06F 9/44* (2006.01)

(52) U.S. Cl. ........ 717/124; 717/102; 717/104; 717/107; 717/109

(58) Field of Classification Search .................. None
See application file for complete search history.

(56) References Cited

U.S. PATENT DOCUMENTS

| 7,165,236 | B2 * | 1/2007 | America | 717/102 |
|---|---|---|---|---|
| 8,015,550 | B2 * | 9/2011 | Berenbach et al. | 717/124 |
| 8,051,404 | B2 * | 11/2011 | McGovern et al. | 717/109 |
| 8,104,017 | B2 * | 1/2012 | Lin et al. | 717/107 |
| 2003/0046029 | A1 | 3/2003 | Wiener et al. | |
| 2003/0159089 | A1 | 8/2003 | DiJoseph | |
| 2004/0216045 | A1 | 10/2004 | Martin et al. | |
| 2005/0091642 | A1 * | 4/2005 | Miller | 717/124 |
| 2007/0028219 | A1 * | 2/2007 | Miller et al. | 717/124 |
| 2008/0263506 | A1 * | 10/2008 | Broadfoot et al. | 717/104 |
| 2009/0094575 | A1 * | 4/2009 | Vieira et al. | 717/104 |

OTHER PUBLICATIONS

Rational Software Corporation, Rational RequisitePro User's Guide, 2003, 334 pages, <ftp://ftp.software.ibm.com/software/rational/docs/v2003/RequisitePro_Using.pdf>.*
Stirewalt et al., UML formalization is a traceability problem, Nov. 2005, pp. 31-36, <http://delivery.acm.org/10.1145/1110000/1107664/p31-stirewalt.pdf>.*
Lormans et al., Reconstructing requirements coverage views from design and test using traceability recovery via LSI, Nov. 2005, pp. 37-42, <http://delivery.acm.org/10.1145/1110000/1107665/p37-lormans.pdf>.*

(Continued)

*Primary Examiner* — Thuy Dao

(74) *Attorney, Agent, or Firm* — Foley & Lardner LLP

(57) ABSTRACT

A front end client-server application configured to synchronize requirements between a requirements repository and a testing repository. The front end client-server application validates a requirement, processes at least one filter associated with the requirement, determines a requirement type of the requirement, and processes the requirement. In addition, the method comprises updating a testing application in accordance with the processed requirement. In addition, it can be determined whether a plurality of requirements received by the front end client-server application that need to be synchronized contain traceability relationships. If so, the front end client-server application replicates the traceability relationship between the requirements to be synchronized and any relevant, existing requirements at the testing repository. Furthermore, the front end client-server application allows a user to customize the requirements synchronization process.

30 Claims, 9 Drawing Sheets

OTHER PUBLICATIONS

Bouquet et al., Requirements traceability in automated test generation: application to smart card software validation, Jul. 2005, pp. 1-7, <http://delivery.acm.org/10.1145/1090000/1083282/p8-bouquet.pdf>.*

Mercury™ Mercury Quality Center™ User's Guide, Version 8.2, 2004, 446 pgs., Mountain View, CA.

Rational Software Corporation®, Rational® RequisitePro® User's Guide, Version: 2003.06.00, G126-5344-00, Windows, Rational® The Software Development Company, 334 pgs.

Office Action on U.S. Appl. No. 11/789,620 (F&L Ref. 037607-0433), mail date Dec. 20, 2010, 15 pages.

* cited by examiner

SYSTEM AND METHOD FOR MAINTAINING REQUIREMENTS TRACEABILITY

CROSS-REFERENCE TO RELATED PATENT APPLICATIONS

The present application claims priority to U.S. Provisional Patent Application No. 60/874,888, filed Dec. 14, 2006 and incorporated herein by reference in its entirety.

FIELD OF THE INVENTION

The present invention relates to requirements management. More particularly, the present invention relates to synchronizing requirements defined and/or stored in a requirements repository with a testing application.

BACKGROUND OF THE INVENTION

The creation of a system and/or software generally entails a development process that includes the specification of requirements and the testing of those requirements against for example, various versions of the software in order to arrive at software having the desired characteristics. A requirement can be thought of as a condition, capability, and/or attribute which the system or software being developed should conform to or contain. Requirements can be specified by a developer or an end-user of the system or software, business policies, and/or any other entity or source having a need for such conditions, capabilities, and/or attributes to be present in the system or software.

Additionally, during the lifetime of a system or software, new requirements can be created, old requirements can be deleted, and current requirements can be updated or otherwise modified. The process of handling requirements during the lifetime of a system or software, e.g., codifying the requirements, verifying the requirements, tracking the requirements, documenting the requirements, auditing the requirements, traceability of the requirements, etc., is generally referred to as requirements management. Thus, requirements management comprises a systematic approach to eliciting, organizing, and documenting system and/or software requirements, and a process which establishes and maintains agreement between a customer and a project team regarding evolving requirements of the system and/or software.

As described above, during the development life cycle of a system or software, requirements are tested against different versions or releases of the system or the software. Testing is done to ensure that the new requirements are implemented correctly, as well as operate correctly when the requirement is tied to a system or software feature.

In order to test the requirements, as described above, a mechanism is needed to synchronize the requirements between where the requirements are stored and the testing environment. Conventional synchronizing applications are very limited in functionality, giving rise to various problems associated with the requirements management and the requirements testing processes. Consider for example, a situation where a test group is currently testing requirements associated with a software release 1.0, where the requirements have been received from a requirements store. Consider as well that a development group has released a new version of the software, i.e., software release 1.1 that contains new software code and has new requirements associated therewith, where the new requirements are uploaded into the requirements store. When a conventional synchronizing application is used to synchronize the new requirements with a testing environment, the new requirements will be blindly updated in the associated testing environment without notifying the test group that new requirements have been uploaded, effectively replacing the requirements currently being tested. Therefore, remaining requirements of software release 1.0 not yet tested will remain untested. In addition, traceability among the same or the same type of requirements between different software releases is lost, creating for example, a situation where it is impossible to determine whether it is software code in release 1.0 or release 1.1 that caused a defect associated with one or more requirements.

In addition, conventional synchronizing applications lack any true configurability or control that can be exercised by a tester or test group. For example, conventional synchronizing applications are typically implemented on one or more servers, thus forcing a tester or test group to access the server to modify any parameters related to the synchronization process. Furthermore, there is no control regarding whether all of the requirements associated with, for example, a software release are to be synchronized with the testing application or only a subset of the requirements are to be synchronized. Also, considering that requirements are synched between the two applications, it would be advantageous to also provide validation and/or authorization processes at the synchronization application to avoid unauthorized or otherwise improper movement of requirements to the testing repository.

Moreover, as described above, any requirements relationships and hierarchies that have been defined and/or identified should be maintained, whereas the conventional synchronizing applications have no mechanism for maintaining those relationships and hierarchies once the relevant requirements are sent to the testing environment. Thus relevant information which might aid testers and test groups in properly and meaningfully testing requirements is lost.

SUMMARY OF THE INVENTION

According to an exemplary embodiment of the present invention, a method of synchronizing a requirement from a requirements repository is provided, where the method comprises validating the requirement, processing at least one filter associated with the requirement, determining a requirement type of the requirement, and processing the requirement. In addition, the method comprises updating a testing application in accordance with the processed requirement.

In another exemplary embodiment of the present invention, a method of updating requirements in a software testing application is provided. The method comprises copying a requirements document from a requirements repository, where the requirements document containing a plurality of requirements. Thereafter, the method further comprises determining a status of each of the plurality of requirements, wherein several actions are taken depending on certain determinations that are made including: upon a determination that a requirement is a new requirement, associating the requirement with a status type identifier and associating the requirement with at least a first attribute value; upon a determination that a requirement is a changed requirement, updating at least a second attribute value associated with the changed requirement; and upon a determination that a requirement is a deleted requirement, deleting the requirement from the requirements document. Furthermore, the method includes updating the requirements document according to the status of each of the plurality of requirements, and forwarding the updated requirements document to a requirements module of a testing application in accordance with a user-specified configuration file, wherein the user-specified configuration file indicates at least a subset of the plurality of requirements to be forwarded, the subset containing only those requirements of the plurality of requirements having tag and attribute values matching tag and attribute values specified in the configuration file. Lastly, the method involves incorporating the requirements included in the subset of requirements into at least one test plan linked to the requirements module.

Although certain features and advantages are described herein, it will be appreciated that the teachings below may be used to implement systems and methods which do not necessarily have any of these features and advantages, but which have other features and advantages.

DETAILED DESCRIPTION OF THE PREFERRED EMBODIMENTS

Figure 1:
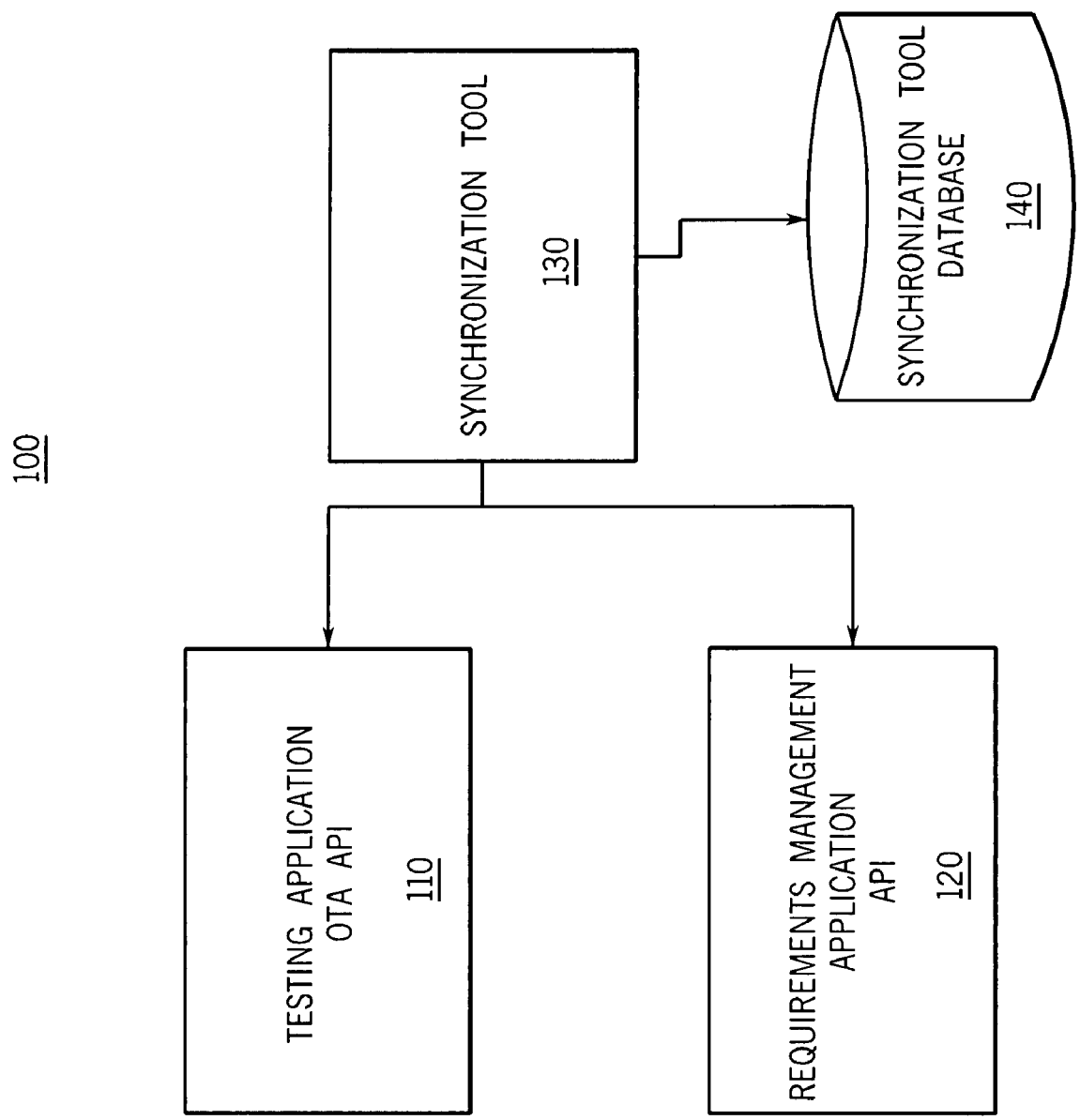
FIG. 1 is a low-level component diagram showing a system architecture in accordance with the various embodiments of the present invention.

The various embodiments of the present invention provide a front end client-server application and method, hereinafter referred to as "the synchronization tool" for performing configured, process-based synchronization of requirements from a requirements repository to a testing application. Various aspects of the synchronization process are easily configurable with the use of a configuration file.

In addition, the various embodiments of the present invention ensure that the requirements themselves, other data associated with the requirements, and users that control or are otherwise involved with the synchronization process are properly validated and authorized to perform the synchronization and be synchronized. Moreover, traceability and changes to traceability between at least two requirements can be maintained throughout the synchronization process allowing the traceability to be correctly replicated in the testing application and repository. Ultimately, the various embodiments of the present invention provide a fast, convenient, and efficient system and method for managing testing efforts in conjunction with requirements management.

A requirements management application can be utilized in conjunction with a requirements repository. Alternatively, either the requirements management application or the requirements repository can be integrated with the other. Regardless of the specific implementation, both the requirements management application and the requirements repository work together to handle requirements management processes. Therefore, the terms "requirements management application" and "requirements repository" are used interchangeably herein.

Various users can access and/or utilize the requirements management application, including: requirements viewers, i.e., those users that simply wish to view requirements documents by querying the requirements repository; requirements contributors, i.e., those users that in addition to viewing requirements, also have permission to change specific aspects of certain requirements; requirements authors, i.e., those users that actually write and/or revise requirements documents and can add, change, and/or delete actual requirements in the requirements repository; and project administrators, i.e., those users that create, manage, and/or oversee all aspects of a project, including creating traceability links within and across projects, creating requirements types, managing security of projects, etc.

It should be noted that the categories of users described above can encompass various personnel including but not limited to, customers, development managers, product administrators, system engineers, software developers, technical writers, auditors, and quality assurance personnel. In addition, the roles of such personnel can change throughout the life of a project or from one project to another. For example, in a project a system engineer may simply start off as a requirements contributor, but as the project progresses, and as may be required, the system engineer may become a requirements author.

It should also be understood that other entities can contribute to the requirements management process. For example, just like a customer may be a source of requirements for a particular software application, regulatory agencies and business policies themselves, may also be considered to be a source of requirements. That is, sources from which requirements can be derived are not limited to human sources. In fact, requirements can arise from anyone or anything having some interest in a particular project, i.e., a "stakeholder."

The requirements management application can be accessed via a client operating on, for example, a personal computer (PC) using, for example, the Microsoft® Windows® operating system (OS). Alternatively, the requirements management application can be implemented as a Web-based client for access over the Internet utilizing a Web browser. Requirements documents can be viewed and modified using the requirements management application provided a user can be validated as having the proper authority to access and modify requirements documents. The requirements management application can also be used to create, view, and modify actual requirements, various attribute views, traceability views (showing the changes made to one or more requirements throughout a development cycle), and hierarchical relationships between different requirements of a certain type, as well as filter, prioritize, and sort requirements.

Furthermore, the requirements management application can be used to create traceability links within and across projects, where a project, which can be created by a project administrator or similar entity as described above, includes the requirements repository. Various physical databases, such as Microsoft Access®, Microsoft SQL Server®, and Oracle®, can be utilized to store requirements as part of a project, where the physical database(s) is operatively connected to and managed by a requirements management application client. It should be noted that the above databases can contain more than one project during any given period. The requirements stored in the requirements repository can be added to, modified, and/or deleted as will be discussed in detail below. When a requirements document changes, i.e., when a requirement is modified, the changes are reflected in the requirements repository. In addition to the actual requirements and requirements documents, related documents can be stored in the requirements repository as well that can be considered to be a part of a project. For example, software and hardware specifications and quality assurance procedures can also be stored in the requirements repository.

A requirements document comprises a description or specification that captures the actual requirements, describes project goals and objectives, and can communicate development efforts and progress. Requirements documents are dynamically linked to the requirements repository allowing changes to the requirements documents to be reflected in the actual requirements as described previously. In addition, requirements documents can be created and saved as different types. For example, some requirements documents can be defined as use-case requirements documents, while other requirements documents can be defined as hardware requirements documents. Furthermore, all documents of the same type, requirements or otherwise, can share functional and stylistic attributes for consistency purposes and ease of management and organization.

A testing application can comprise the testing application itself and an associated testing repository for storing any test-related data, e.g., test cases, test results, defect reports, etc. The terms testing application and testing repository are used interchangeably herein as well. The testing application can be implemented as a Web-based client that is accessible over the Internet or a local area network (LAN), such as a corporate intranet, using a Web browser.

In order to utilize the testing application, the requirements to be tested are specified by analyzing the software or system at issue and determining relevant testing requirements. This analysis and determination involve defining a testing scope which will achieve any specified test goals, objectives, and strategies. A requirements tree can then be built to define overall testing requirements. Once the requirements tree is created, a list of detailed testing requirements can be created for each branch or topic of the requirements tree. In addition, each requirement can be described in detail, have a priority level assigned thereto, and have attachments added thereto as well. After the testing requirements have been reviewed and/or modified and deemed sufficient to meet the defined testing scope, a test plan can be created.

The test plan can be created by defining any test strategies to be used. In defining test strategies, the actual software or system to be ultimately tested, a system environment, testing resources, such as test personnel and testing hardware can be considered. Then, the software or system can be subdivided into various sections or functions and can be represented as a hierarchical test plan tree. The different types of tests necessary to sufficiently test the various sections or functions are determined next, where test definitions can be specified. At this point, the various requirements to be tested described above can be linked to one or more of the testing requirements. In addition, manual tests can be developed by adding test steps to the tests that have been created in the test plan tree, where test steps refer to actual test operations test personnel should execute, as well as any expected test results. If automated tests are deemed appropriate, test scripts can be created which provide the testing application with its own automated test operations/steps to perform.

Once the actual tests have been created, the tests can be grouped, thus forming test sets based on the various requirements needing testing and on the various testing goals that were previously defined. The various tests or sets of tests can be executed one or more times depending on the requirement(s) being tested at that time. In addition, the running of the test or sets of tests can be automated as described above and scheduled to run without further human involvement.

After testing has been completed, or throughout the testing process, identified defects in the software or system can be reported using a defect reporting' function of the testing application. It should be noted that it is not only testers or test groups that can utilize the defect reporting function. Developers, system managers, end users, etc. can also submit defect reports during any phase of the testing process. Allowing such broad reporting minimizes the chances that a defect or problem in the system or software goes unnoticed. Once defect reports are submitted, they can be reviewed and analyzed so that they can be subsequently fixed. In addition, reports and other notifications can be created and transmitted to aid in the analysis of the defect reports and the repair progress.

This testing process can be performed as many times as is necessary or is allowed given any timing restraints, i.e., release date of the software or system. In addition, new builds, e.g. new software release versions, can be developed and re-tested using the same tests, test plans, etc., or new or modified tests and/or test plans can be utilized as required. In addition, existing requirements are tested as well, conventionally referred to as regression testing, to ensure that the existing requirements remain correctly implemented or features associated with the existing requirements are not disturbed or otherwise affected by new requirements, features, and/or software code in, for example, a new software version or release. As well, integration testing, system testing, and unit testing can be performed, where the various levels of testing refer to different stages or scopes of testing coverage. For example, unit testing can refer to the testing of only a particular software module, whereas system testing occurs on a complete system having all relevant software modules integrated therein in order to determine the complete system's compliance with the specified requirements.

Like the requirements management application, the testing application can utilize testing application projects as well to organize and manage the testing process described above. A user can create a testing application project and store, and manage any information or data generated and/or gleaned by the testing application in a testing repository. That is, a testing application project can comprise one or more of requirements linked to the tests, tests, test sets, test plans, test runs, defect reports, and any other relevant documentation.

Also like the requirements management application, security is implemented in the testing application, where access to a testing application project is limited to those users with the proper authority. Lists of authorized users, user groups, and passwords can be created for association with the various testing application projects. Different levels of access can be given to different users and/or user groups, where certain users and/or user groups can add, modify, and/or delete certain portions of the testing application projects. In addition, the rules governing access to the testing application projects can be customized as needed for each project.

Referring to FIG. 1, a low-level component diagram is illustrated showing the basic elements of a requirements synchronization system 100. The synchronization tool 130 is implemented as a front end client-server application that is operatively connected as an intermediary application between the Testing Application Open Tools Application Programming Interface (OTA API) 110 and the Requirements Management Application API 120 for managing and controlling the synchronization of requirements from the requirements repository to the testing repository. An API refers to an interface that an application provides in order to allow requests for services from that application to be made of it by other applications and/or to allow data to be exchanged between the applications. Therefore, the Testing Application OTA API 110 resides within the testing application and the Requirements Management Application API 120 resides within the requirements management application.

In addition, the synchronization tool 130 accesses its own synchronization tool database 140 for various processes which will be discussed in detail below. It should be noted that the synchronization tool database 140 can comprise one or more Oracle database(s), Microsoft Access or SQL Server database(s), or any other appropriate database(s). Furthermore, the Requirements Management Application API 120 can access its own database (not shown) where the requirements to be synchronized are stored, and the Testing Application OTA API 110 can also be associated with its own database (not shown) for storing test-related data, such as test plans, defect reports, etc.

Figure 2:
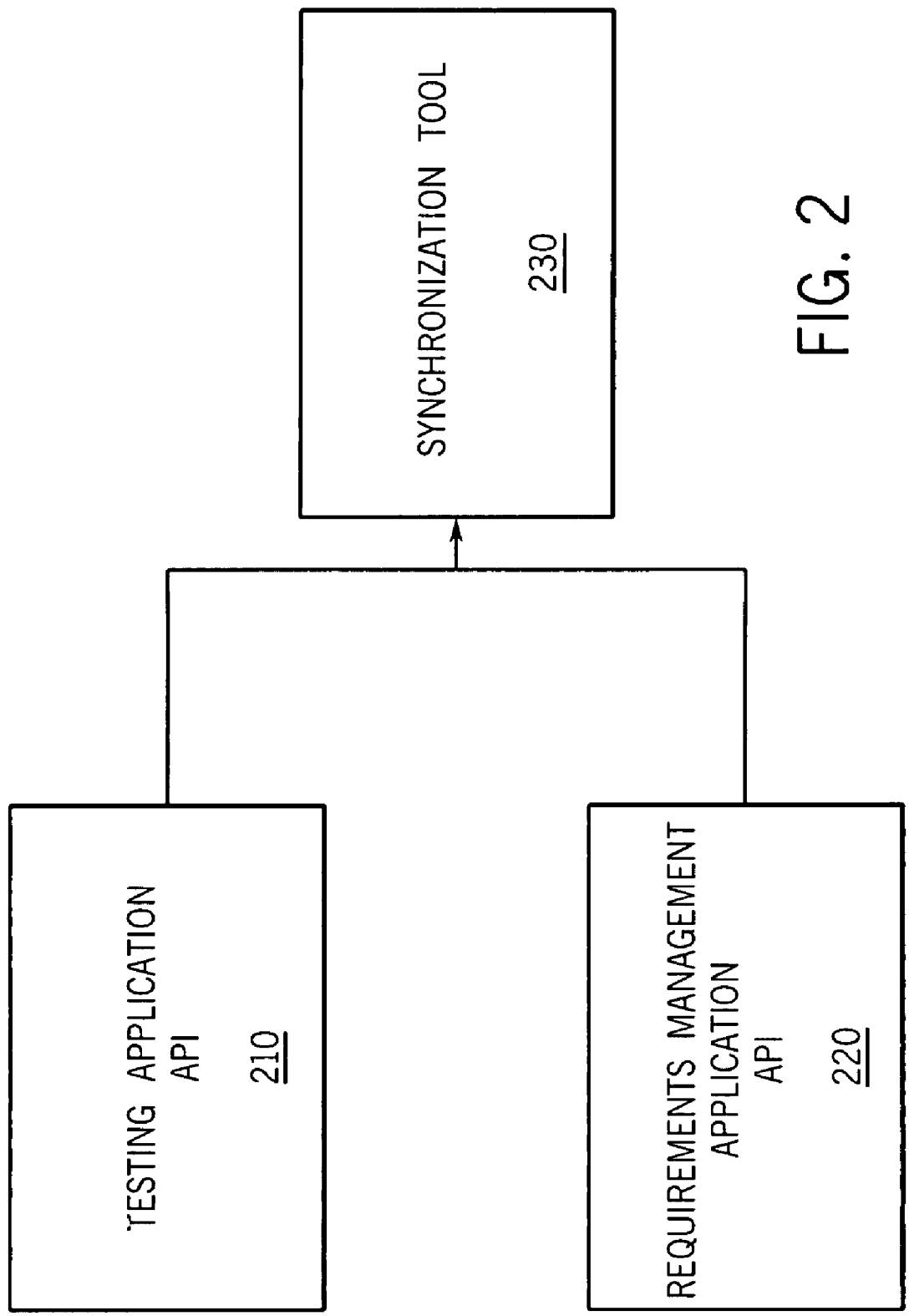
FIG. 2 is a low-level class diagram showing the class architecture of the system of FIG. 1.

FIG. 2 illustrates a class diagram as having a Testing Application API class 210, a Requirements Management Application API class 220, and a synchronization tool class 230. In object-oriented programming, classes can be used to group various functions and/or variables that are related. It can be seen that the physical component structure and relationships between the Testing Application OTA API 110, the Requirements Management Application API 120, and the synchronization tool API 130 described in FIG. 1 is mirrored in the class diagram shown in FIG. 2, where the synchronization tool class 230 bridges the Testing Application API class 210 and the Requirements Management Application API class 220.

As mentioned above, various embodiments of the present invention are configured to bridge a requirements repository to a testing application. Therefore, the synchronization tool can connect to any requirements management application project and to any testing application project and synchronize the requirements of the requirements management application project. In addition, the synchronization tool can customize the synchronization based on configuration settings representing desired synchronization characteristics. The synchronization tool can retrieve requirements specified in documents created and/or stored in the requirements repository and process the requirements based on configuration settings specified in a synchronization tool configuration file discussed in further detail below. The synchronization tool then inserts the requirements into a testing application requirements module.

It should be noted that identifiers, e.g., a requirement name, of the particular requirements are maintained during the synchronization process and appear the same upon retrieval from testing application requirements module, for example, when a tester retrieves the particular requirements he or she needs to test. In addition, any text or metadata associated with each of the particular requirements received from the requirements repository appear as a requirement description discussed in further detail below.

It should further be noted that any synchronizations that occur between the requirements management application and the testing application are "one-way" synchronizations. That is, a read-only copy of the requirements to be synchronized between the requirements repository and the testing repository is sent to the testing repository, as opposed to actual requirements documents, maintaining the requirements repository as a master requirements repository. As will be discussed in further detail below, a tester utilizing the testing application need only be able to identify the requirements for actual testing of the requirements, mapping the requirements to a test cases and/or a test plan, etc. In other words, the tester does not need access to the actual document containing the requirements. This prevents any inadvertent alterations to the requirements documents or the requirements themselves. In fact, the system 100 can be configured in such a manner that in order to change requirements or requirements documents, a user must first be authenticated, validated, and/or authorized to do so by accessing the requirements management application directly, e.g., by logging onto a requirements management application client. It should be noted that looser or stricter access requirements can be implemented.

In addition, testing application projects can be protected as well, by creating a testing application back-up project before commencing with a synchronization tool synchronization. Therefore, in the event that a particular synchronization is somehow interrupted, corrupted, or otherwise adversely affected, an existing testing application project to-be synchronized is not lost, and can be utilized in a subsequent synchronization. Alternatively and/or in addition, testing application projects can be backed up immediately after a synchronization as well and stored for a predetermined or other amount of time for contingency purposes.

Figure 3:
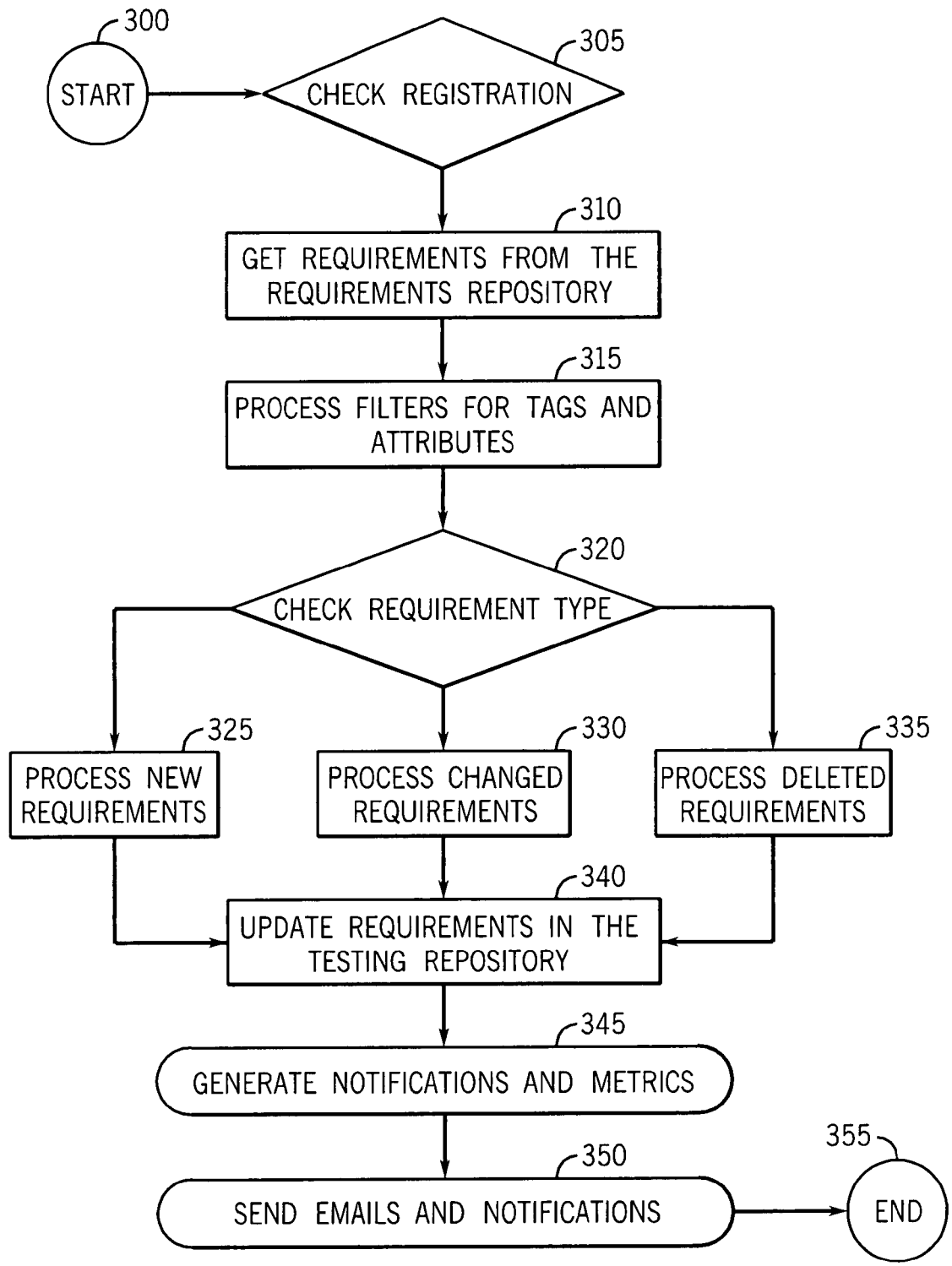
FIG. 3 shows a flow chart illustrating an overview operation performed in accordance with the various embodiments of the present invention.

FIG. 3 illustrates a flow chart showing a general overview of the operation of the system 100. Operation begins at step 300 when a user first accesses an instance of the synchronization tool. As described above, the synchronization tool is a front end client-server application. Instances of the synchronization tool may be implemented on client machines, where application instances are loaded and executed on each client machine, giving a user localized access to the synchronization tool. Localized implementation of the synchronization tool gives various users the ability to conveniently configure the operation of an instance of the synchronization tool to suit that particular user's needs instead of having to access the synchronization tool at a single, central location. In addition, local implementation of the synchronization tool allows requirements to be synchronized according to certain criteria specified by a first user without the risk of interfering with another synchronization operation initiated by a second user according to different specified criteria.

At step 305, registration is checked, where one or more validation, authentication, and/or authorization procedures are performed to ensure that the synchronization tool is being accessed by an authorized user and that any project being accessed is also authorized for synchronization via the synchronization tool. Requiring user validation is important in that users initiating synchronizations should be properly trained and well versed in using the synchronization tool. Requiring project authorization is useful for various control and/or compliance regulations, such as Enterprise Level System Implementation Framework (ELSIF) requirements, where requirements management application and testing application projects should match up before synchronizing requirements between them. More or less validation, authentication, and/or authorization processes may be performed by and/or in conjunction with a synchronization tool synchronization. Furthermore, differing levels of authority may be given to different entities. For example, a test user may only have the authority to access a particular requirements management application and testing application project related to a particular software release version, whereas a requirements management supervisor may have access to all requirements management application and testing application projects related all release versions of a particular software application.

Referring back to FIG. 1, registration data, such as projects, project identifiers, user identifiers, etc. associated with authorized projects and/or users can be stored in the synchronization tool database 140. In particular, a user can log onto an instance of The synchronization tool using his or her username and password, where the user can be a tester, a test manager, or any other entity that can properly request a synchronization. The username can be one that is associated with a particular requirements management application project. It should be noted that the username associated with the requirements management application project can be the same username associated with a related testing application project, where the testing application project can be a collection of requirements, tests, test sets, test runs, defect reports, customization data, and any other related documentation. When the same username is utilized for both a requirements management application and a testing application project, The synchronization tool can internally connect to both the requirements management application and the testing application without requiring the user to manually connect to both applications separately.

Alternatively, different usernames can be utilized, in which case extra processes can simply be invoked in order to determine which requirements management application project should be associated with which testing application project for synchronization. If either the user or the project cannot be validated, synchronization is not allowed and an error message can be sent or displayed to the user. Furthermore, unauthorized attempts to access The synchronization tool can be logged and tracked, where notifications, for example, by email, can be sent to the proper entity, e.g., a project manager, a test manager, security administrator, etc. This is useful for Sarbanes-Oxley (SOX) corporate governance requirements compliance.

At step 310, desired requirements associated with the authorized requirements management application and testing application projects are retrieved from the requirements repository. At step 315, various filters are processed to extract various requirement type tags and/or attributes associated with the requirements. Steps 310 and 315 are performed according to certain criteria specified in a configuration file, including those filters, i.e., requirement type-based filters and attribute value-based filters.

A requirement type refers to a class of requirements, which can be defined as desired for a particular project, or across projects. Defining requirement types allows requirements authors and/or stakeholders to more easily manage the various requirements associated with a project by grouping certain requirements into more manageable subsets. This becomes helpful, for example, when testing a requirement, where the testing process can be divided among different testing groups. In addition, any changes, additions, or deletions to the requirements and/or their effect on, for example, a particular software product can be managed and seen more easily and more clearly.

The requirement type-based filters indicate to The synchronization tool that only those requirement types identified by the requirement type-based filters listed in the configuration file are to be processed, i.e., synchronized. For example, different types of requirements can be specified, such as scope requirements, functional requirements, non-functional requirements, background requirements, use-case requirements, etc. It should be noted that a user can define any type of requirement desired for that user's particular purpose. If only one type of requirements, for example, functional requirements, need to be tested and thus synchronized with the testing repository, the requirement type-based filter will ensure that only requirements of the functional type will be synchronized. This requirement type-based filtering is accomplished by referencing a requirement type tag associated with each requirement. The requirement type tag is specified in the requirements repository.

Considering the functional requirements example described above, all functional type requirements are tagged with a functional identifier in the requirements repository. When the configuration file is created, an identifier such as "*FUNC" is specified. Therefore, at step 315, when the various filters are processed, The synchronization tool knows only to synchronize those requirements tagged with the functional identifier. It should be understood that more than one requirement type can be specified and synchronized according to the configuration file by simply indicating another requirement type, such as "*SCOPE." It should also be understood that different requirements management application projects can have different requirement type tags specified therein.

The attribute value-based filters comprise another method of filtering certain requirements for synchronization. Whereas a requirement type refers to a particular kind or class of requirements, an attribute can refer, for example, to that information which can be utilized to manage a requirement in some particular way. For example, if requirements need to be filtered and synchronized based on a particular attribute value, such as requirements associated with a certain software release, an attribute value-based filter specifying that certain software release can be indicated in the configuration file. Those requirements in a requirements management application project that are associated with a different software release value are ignored and left unsynchronized.

Requirements can be tagged with attribute values indicating anything of interest or use to the requirements management and testing processes, where attributes can be defined, articulated, and managed in project documents and/or the requirements repository itself. Aside from software release versions, attribute information can include, but is not limited to a relative benefit of a particular requirement, an implementation cost of a certain requirement, a requirement's priority, and the level of testing that is appropriate for a specific requirement. For example, one requirement can be tagged with an attribute value indicating that it should be tested at the system test level, while another requirement can be tagged with an attribute value indicating that it should be tested at the unit testing level. It should be noted that parent-child dependencies are considered, e.g., all the child requirements belonging under a particular parent requirement have certain attribute values which are the same.

A configuration file can be used to specify how requirements are to be synchronized attribute-wise from the requirements repository to the testing repository. That is, attributes of requirements can be mapped from the requirements repository to the testing repository fields using system field mappings. An example set of fields that can be utilized by The synchronization tool are shown in Table 1.

TABLE 1

| Testing Repository Database Column | Testing Repository Field Label/ Requirements Management Application Attribute | Significance |
| --- | --- | --- |
| RQ_USER_03 | Document/Location | Location of a Requirement in the requirements repository. This can be the name of the |

TABLE 1-continued

| Testing Repository Database Column | Testing Repository Field Label/ Requirements Management Application Attribute | Significance |
|---|---|---|
| RQ_USER_14 | Package | Document of which the requirement is a part of OR Database. Indicates whether a requirement is a Package in the testing repository. "ROOTPKGYes" indicates that the requirement is a Root Package "PKGYes" indicates that the requirement is a Package. |
| RQ_USER_16 | Version Number/ Revision | Indicates the Revision number of a requirement in the testing repository |
| RQ_USER_17 | Changed | Indicates whether a requirement has changed in the testing repository. Can Be True or False. |
| RQ_USER_21 | Deleted | Indicates whether a requirement has been deleted. Can be True, False. |
| RQ_USER_24 | GUID | Indicates the GUID of a requirement |
| RQ_USER_25 | Trace To | Tags of Requirements to which a Requirement is traced to. |
| RQ_USER_26 | Traced From | Tags of Requirements from which the requirement is traced from. |
| RQ_USER_29 | Change Reason | The reason for any requirement change in the requirements repository will be captured from this field and populated in the testing repository. |
| RQ_REQ_NAME | Name/Name | Indicates the name of the requirement. The name in the testing repository is displayed as follows REQ_TAG : Name : Text |
| RQ_REQ_COMMENT | Description/Text | The requirement Text is mapped to the description field in testing repository. |
| RQ_REQ_PRIORITY | Priority/Priority | Indicates the Priority of a Requirement |

Non-system field mappings can also be processed by The synchronization tool. In this situation, a comment can be expressed in the configuration file using the following syntax in order to properly map requirements attributes from the requirements repository to the testing repository:
$TESTINGREPOSITORY_COLUMN_NAME^,
TESTINGREPOSITORY_LABEL@REQUIREMENTS
MANAGEMENTAPPLICATIONATTRIBUTENAME
For example, the above comment could be used to map a scope attribute, even though scope is not a system-defined attribute, by including the comment
"$RQ_USER_18^,Scope@Scope."
In addition, similar to the manner in which desired requirements types can be indicated by an identifier in the configuration file, a comment regarding a desired attribute value can be included in the configuration file. An attribute value filter syntax can be "AttributeName, Value," where for example, if it is desired to synchronize those requirements having a high priority, the comment "~Priority, High" is included in the configuration file.

Besides attribute values and requirement types, other information can be included in the configuration file, such as notification email addresses, log file locations, and priority values which are used to inform The synchronization tool of the order in which requirements are to be synchronized. It should be noted that different configuration files can be locally created and stored, thereby allowing different Synchronization tool users to specify how requirements are retrieved and synchronized.

Another set of requirement types indicates whether the retrieved requirements are new requirements, changed requirements, or deleted requirements. At step 320, these requirements types are checked. The process continues to step 325 when the requirements to be synchronized are new requirements, step 330 when the requirements to be synchronized are changed requirements, and step 335 when the requirements to be synchronized are deleted requirements. The requirements to be tested in the testing repository are updated at step 340.

At step 345, The synchronization tool generates various notifications, such as audit trail logs and metrics. After each execution of a synchronization instance is completed, The synchronization tool can generate an audit trail log of all the actions taken during that particular synchronization instance. The audit trail log can contain one or more of, but not limited to, the following pieces of information: requirements management application project name; requirements management application user who performed the synchronization; testing application project name; testing application user who performed the synchronization; Packages processed; Requirements processed; Total requirements processed at the root level and at the child level; Check for deleted requirements and packages; and Synchronization start and end time. Additional, fewer, and/or different information may be captured in an audit trail log.

It should be noted that a package can refer to units of related artifacts. That is, packages are abstract, structural objects utilized to conveniently organize requirements and any related information within the requirements management repository. Project information can be organized in folders within packages. By utilizing packages to organize requirements and their related information, stakeholders, users, business team members, etc. can more easily find and access desired data. Packages can be created, modified, deleted, and/or moved to, from, and/or under another package. For example, requirements associated with a particular software feature can be grouped in one package. The synchronization tool is able to recognize and retain packages during a synchronization to the testing repository, described below.

Audit trail logs can be created using various methods. For example, audit trail log documents can be created with word processing and/or spreadsheet applications that are accessed separately from The synchronization tool or integrated therein. Alternatively, the information captured in the audit trail logs can be transmitted within an email, a Hypertext Markup Language (HTML) document, or other type of text message. In addition, formatting of the information captured in the audit trail logs can be, but is not limited to, tabular formats, charts, graphs, and detailed listings. Furthermore, the types of information that are to be captured in the audit trail logs can be specified by an authorized user either before the synchronization or after the synchronization is complete.

If an error message was generated during execution of a synchronization, the audit trail log can capture the exact text of the error message and any associated requirement tag(s) and the GUID, where the GUID refers to a unique identifier for each requirement in the requirements management application. Another related auditing feature of The synchronization tool allows a user to determine which requirements have been tested and which requirements have not been tested. This type of auditing provides a way to verify testing data and is a useful way to track the progress of a development cycle. In addition, such auditing allows interested entities to determine whether the correct requirements during one or more test cycles have been tested.

After each execution of a synchronization instance, The synchronization tool can also generate metrics that also identify certain actions, events, and/or other information related to the synchronization instance. Metrics can be outputted in a HTML format and can contain one or more of, but not limited to, the following information: Synchronization executing date; Synchronization execution time; requirements management application Project name; testing application Server name; testing application Domain; testing application Project; requirements management application User; testing application user; Number of New Requirements; Number of Changed Requirements; Number of Deleted Requirements; Total Requirements in the requirements management application; Total Requirements in the testing repository before synchronization; Total Requirements in the testing repository after synchronization; the testing repository Total Packages; List of New Requirements in the current synchronization; List of Changed Requirements in the current synchronization as compared to the previous synchronization; and List of Deleted Requirements in the current synchronization compared to the previous synchronization.

Additional, fewer, and/or different information may be captured and output in the metrics. In addition, metrics, like the audit trail logs, can be output in additional and/or different formats as well. It should be noted that not only a number of changes requirements is determined and displayed in a particular metric, but the actual requirements themselves are displayed. Therefore, a metrics report could simply be printed out and used by a tester or test group during testing. Furthermore, the types of information that are to be captured in the metrics can be specified by an authorized user either before the synchronization or after the synchronization is complete.

It should also be noted that in the testing repository, all packages are considered to be the same as the requirements, which is inconsistent with how the requirements management application characterizes packages. To reconcile this difference, The synchronization tool allows a user to set a user-defined field "Package"=Yes, where for all other requirements within the package, this user-defined field is left blank. Furthermore, if there has been no update to a requirement during a current synchronization instance, the testing repository retains an earlier synchronization update time and date.

At step 350, The synchronization tool can send various emails and notifications to appropriate entities, such as test managers, test case authors, software developers, any users listed in the configuration file, The synchronization tool administrators, etc. at the end of each synchronization instance. The emails can contain as described above, for example the audit trail logs and the metrics described above. It should be noted that emails can be sent out regardless of whether or not the synchronization was successful. Step 355 indicates the end of the synchronization process when a user exits The synchronization tool. Although transmitting notifications is described with relation to emails, the notifications can be transmitted using other formats, e.g., a text messaging format.

Figure 4:
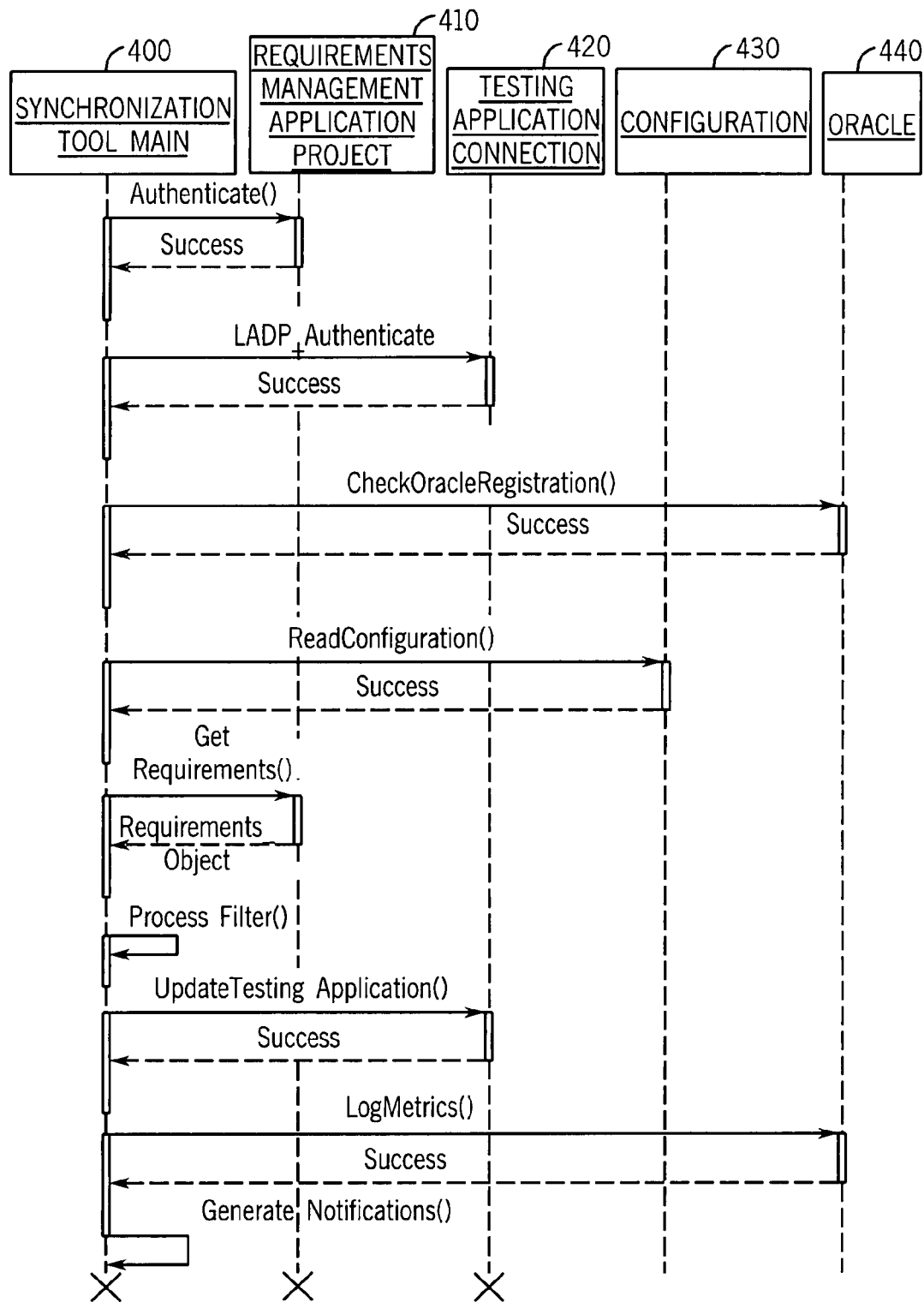
FIG. 4 shows a sample of a sequence diagram illustrating a sequence of steps that occur during the operation of FIG. 3.

FIG. 4 illustrates a sample sequence diagram showing the sequence of steps that occur during a Synchronization tool synchronization operation. Synchronization tool Main 400 attempts to verify authentication from Requirements Management Application Project 410. This is accomplished by the synchronization tool using a requirements management application40.Application object to create an instance of the requirements management application. This object is then used to create a Requirements Management Application40.Project object, and the requirements management application user is authenticated using an OpenProject( ) method. If authentication is successful, a Lightweight Directory Access Protocol (LDAP)_Authenticate( ) process is initiated by the Synchronization tool Main 400 to Testing Application 420. At this point in the process, The synchronization tool creates a testing application object and retrieves relevant domain and project lists from Testing Application 420 by calling an InitConnection( ) method, after which, a ConnectProject( )method is called to authenticate a testing application user with the LDAP.

Once authentication is completed, the Synchronization tool Main 400 attempts to check registration with the Synchronization tool Oracle database 440. This is accomplished by calling a CheckOracleCatalog( ) method to authorize the Requirements Management Application project with the Synchronization tool database 140. Then, a configuration file is read by the synchronization tool by accessing Configuration 430 by calling ReadConfigFile( ) to read any field mappings. The synchronization tool Main 400 transmits a GetRequirements( ) request to Requirements Management Application Project 410, after which the Requirements Management Application Project 410 returns a Requirements_Object information. The synchronization tool Main object 400 processes the applicable filters, if any exist in the configuration file and updates the requirements in Testing Application 420. A Synchronize( ) method is called as well which in turn calls PrintPrackage( ), Reparent Package( ), PostPackageDelete( ), ReparentRootRequiremenets( ), and ReparentChildRequirements( ) methods to compete the synchronization process.

Audit trail logs and metrics are generated by the synchronization tool Main 400 and stored at the synchronization tool Oracle database 440 using a WriteOracleMetrics( ) method, after which, the appropriate notifications, as described above, are generated by calling a Sendmail( ) method. It should be noted that one or more requirements management application projects can be synchronized with one or more testing application projects.

Moreover, the synchronization tool synchronization process can occur at a relatively fast rate, where the speed of synchronization can be affected by the processing speed of any physical elements within which or with which the synchronization tool synchronization process occurs. For example, the speed at which, for example, an Oracle database acting as the synchronization tool database 140 can respond to a database query requiring the accessing of requirements affects how many requirements can be synchronized from the requirements repository to the testing repository. A baseline rate of operation however, can be set at 1000 requirements synchronized in 10 minutes. In addition, the amount of data traffic present on a network in which the synchronization tool is implemented can also affect the synchronization speed. As will be discussed below, the synchronization tool can be configured to run at off-processing times where other system resources are not accessing and/or otherwise utilizing the network, resulting in faster synchronization speeds.

Figure 5:
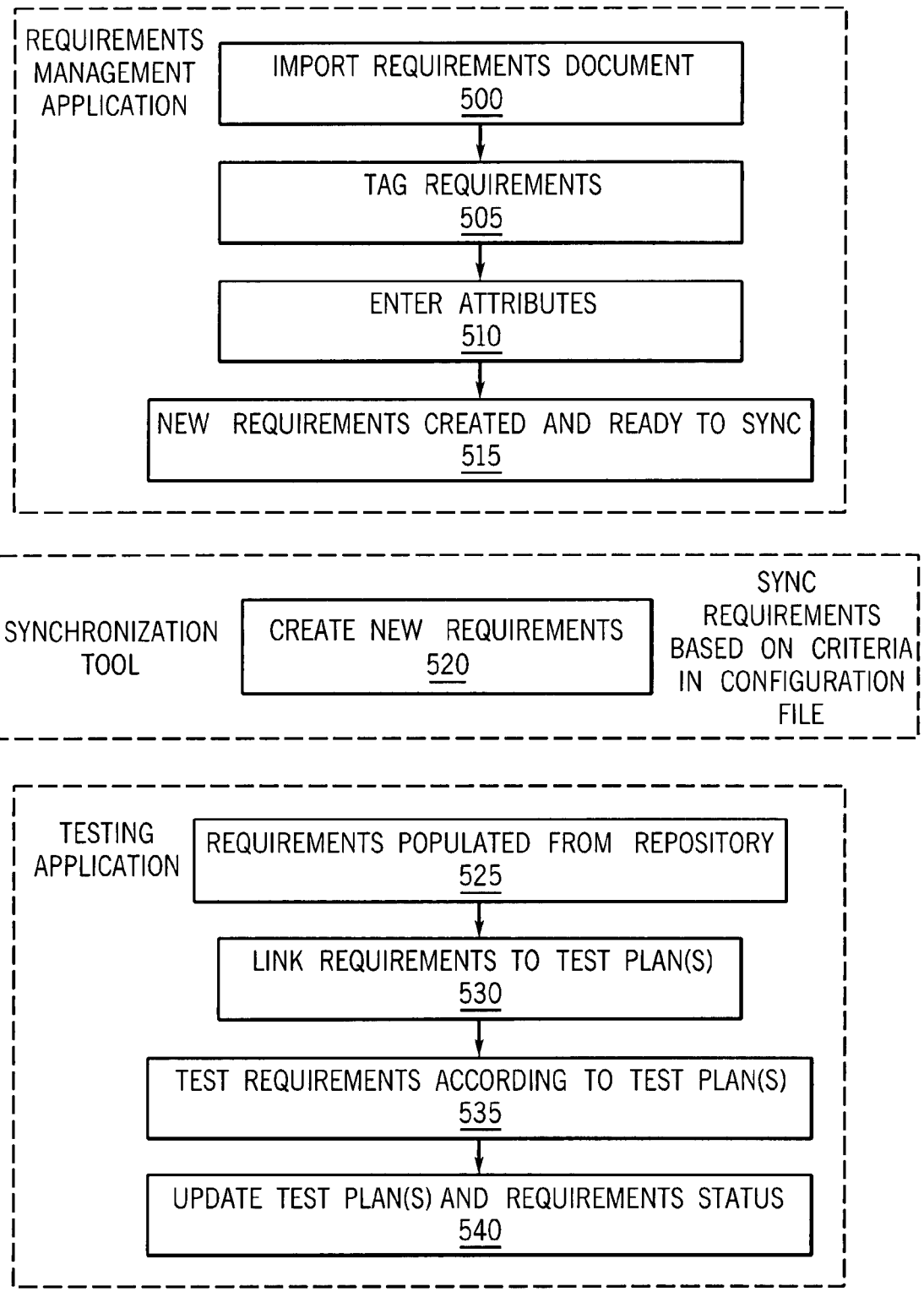
FIG. 5 illustrates a synchronization operation in accordance with a first embodiment of the present invention.

As mentioned above, another type of requirement refers to whether a particular requirements is new, changed, or deleted. FIG. 5 illustrates a synchronization operation for new requirements in greater detail. At step 500, the requirements repository imports a new requirements document containing therein specifications for new requirements that are to be created. Alternatively, the new requirements document can be created using the requirements management application itself. At step 505, the new requirements are tagged according to their requirement type, while at step 510, the various attribute values associated with each of the new requirements are entered. At step 515, the new requirements are created and can be considered ready to synchronize with the testing repository using the synchronization tool. At step 520, a copy of the new requirements are created in the synchronization tool.

At step 525, the new requirements from the requirements repository are populated in the testing repository. It should be noted that any conditions relating to the requirements tags and/or attribute values are specified in the configuration file used by the synchronization tool and any appropriate filters are applied to the new requirements as described above. Once the testing repository has been populated with the new requirements, the new requirements are linked to a test plan(s) at step 530. At step 535, the new requirements are tested according to the test plan while utilizing the various features and capabilities of the testing application. Lastly, at step 540, existing test plans can be updated and the status of the new requirements is also updated. For example, the new requirements can be identified as being tested successfully. It should be noted that any mappings between existing requirements and test cases are maintained.

In addition, processing new requirements in such a manner allows a tester dr test group to be cognizant of what requirements he or she is testing that are new and may belong to a new software release. This aids in distinguishing the new requirements from those requirements he or she is testing that are old and may belong to a previous software release, which can result in efficiency gains by determining that only the new requirements need to be tested. Furthermore, a synchronization instance for new requirements, or any other type of requirement, can be initiated at any time after accepting the new requirements, the changed requirements, etc. into the synchronization tool.

From a quality assurance processing perspective, the synchronization tool ensures that requirements can be baselined, are well written, audited, etc. before any testing on those requirements begins. From a resource utilization perspective, appropriate times for synchronization can be determined before initiating a synchronization to ensure that the taking of any system resources for the synchronization will not affect other users of those resources. This is especially important when different development or requirements-generating groups access and download or create requirements in the requirements management application without knowledge by testing groups. Thus, synchronizing requirements via the synchronization tool does not result in a blind dump of requirements into the testing repository. In addition, in situations when multiple testers or test groups are testing multiple requirements related to multiple software packages, software release versions and/or requirements management application projects, which requirements get sent to which testers or test groups can be managed and easily tracked for later review.

Figure 6:
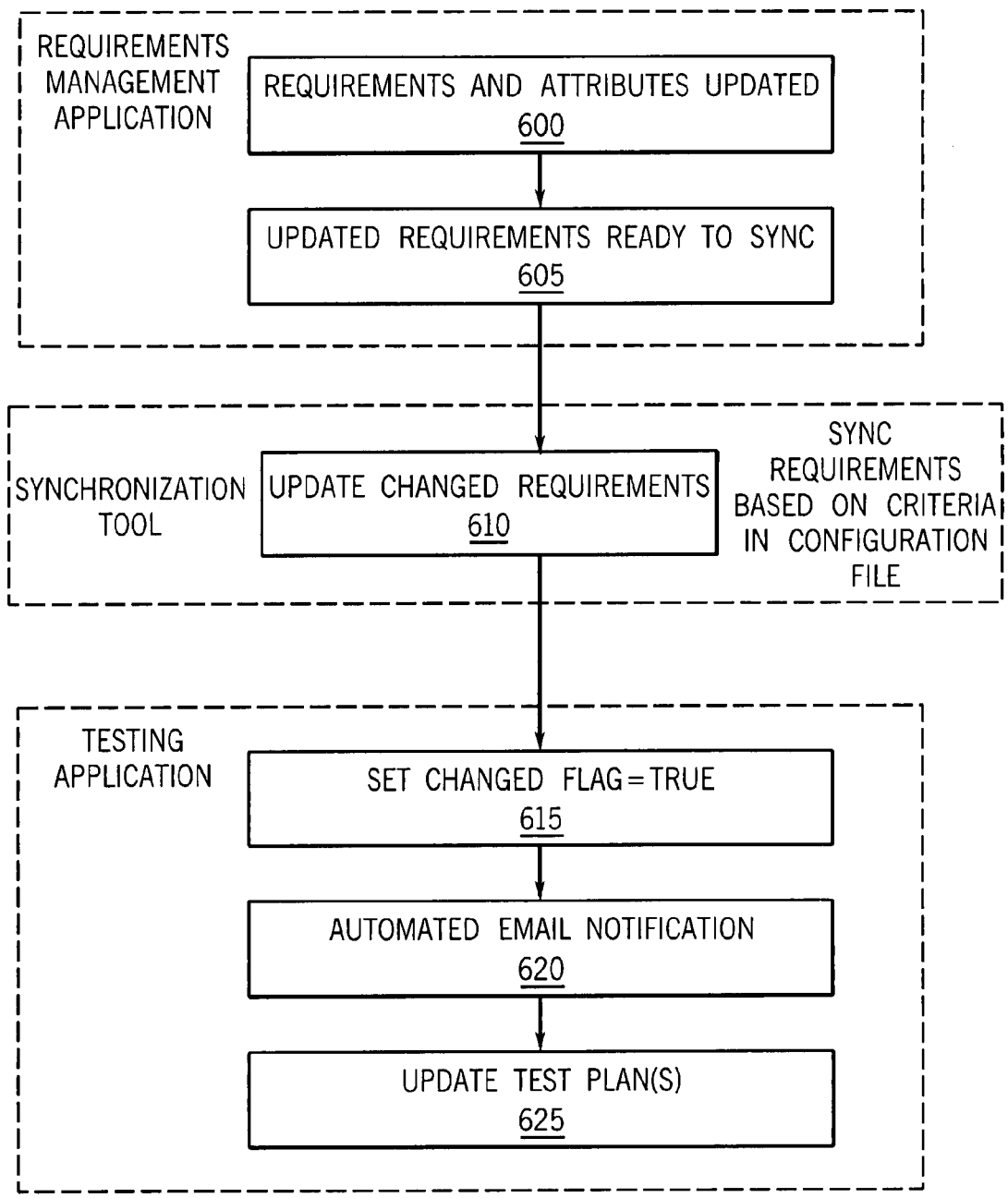
FIG. 6 illustrates a synchronization operation in accordance with a second embodiment of the present invention.

FIG. 6 shows a more detailed flow chart illustrating a synchronization operation involving changed requirements. Any requirements and/or related attribute values are updated within the requirements repository at step 600. At step 605, the updated requirements can be considered ready for synchronization with the testing repository. At step 610, the synchronization tool updates those requirements that have been changed in a separate copy of the requirements and sends the copy of the updated requirements to the testing repository. At step 615, a "changed" flag in the testing repository is set to "True." This allows for the preservation of any existing requirements in the testing repository that have not changed. A user can be given the ability to blank out the changed flag for such existing requirements.

In addition, if a changed requirement is associated with data indicating a reason why the requirement was changed, that data is captured from the requirements repository during the synchronization process and copied to the testing repository as well. Such information becomes very useful during the testing process. For example, not only can the tester focus on testing only those requirements that have been updated, as opposed to re-testing requirements that have already been tested, but the tester is able to determine why a requirement was updated, which could influence or otherwise impact how the tester tests the updated requirement. Furthermore, an option in the synchronization tool is provided which allows a user to blank out all the changes populated in the testing repository for a previous synchronization instance, if any, to allow the user to see the total changes made to the requirements for the current synchronization instance, as opposed to merely a running tabulation of changes.

Regression testing can also be easily performed when it can be determined what requirements have been changed and what requirements have remained the same. That is, testing can be performed on those requirements or functions related to those unchanged requirements to determine whether or not the requirements and/or functionality are stable or have been affected by the changed requirements.

At step 620, an email notification is automatically outputted indicating the changes made to the updated requirements and/or the changed requirements that were updated during the current synchronization instance. At step 625, any existing test plans can be updated as well to reflect any adjustments made to adapt testing to the changed requirements.

Figure 7:
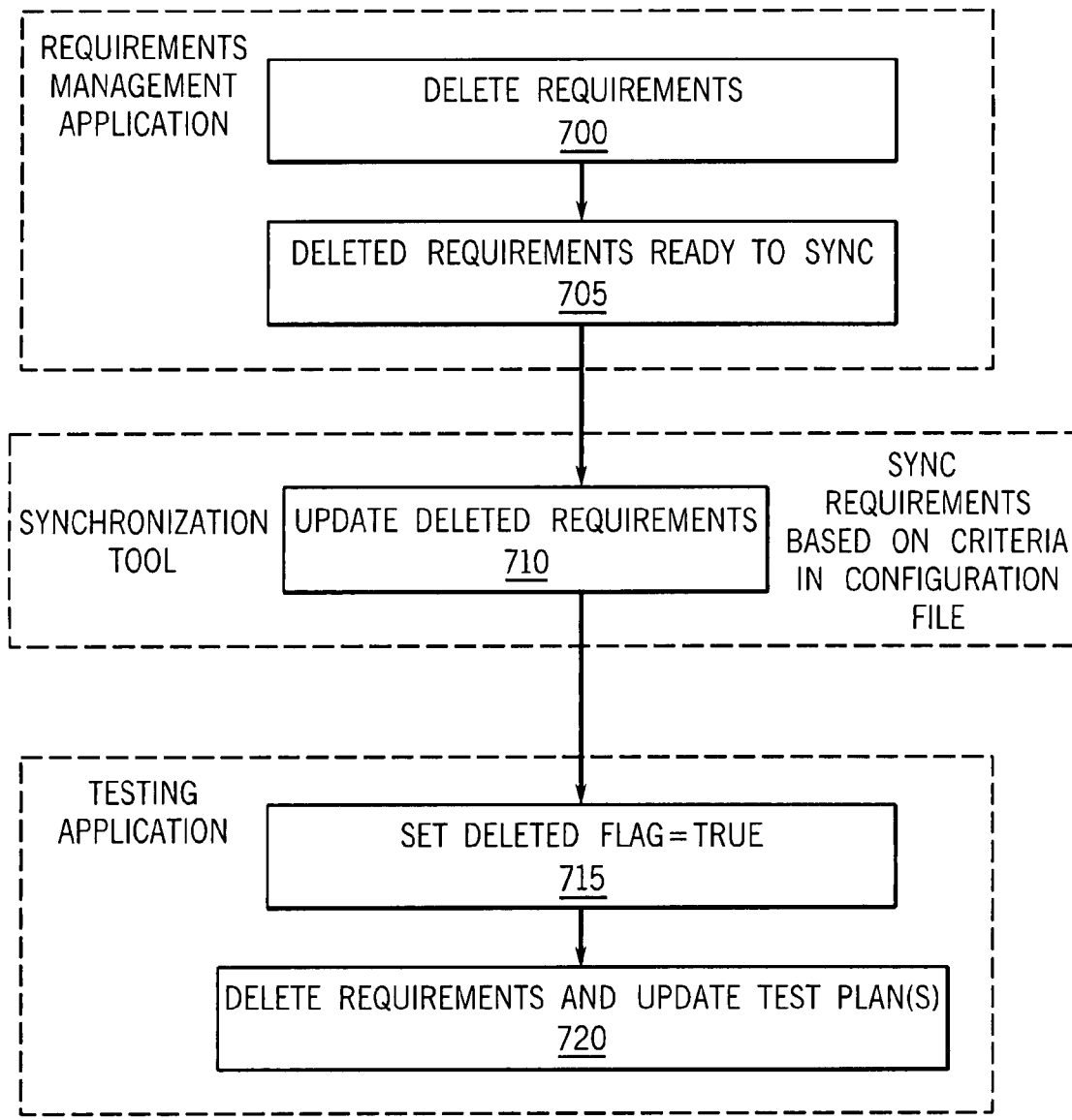
FIG. 7 illustrates a synchronization operation in accordance with a third embodiment of the present invention.

FIG. 7 shows a more detailed flow chart illustrating a synchronization operation involving the deletion of requirements. At step 700, the desired requirements can be deleted from the requirements repository. At step 705, the deleted requirements are ready to be synchronized with the testing repository. The synchronization tool copies the deleted requirements from the requirements repository and updates their status in the synchronization tool at step 710. The synchronization tool compares the requirements existing in the testing repository to those requirements copied from the requirements repository. If a requirement has been deleted in the requirements repository, a deleted flag associated with that deleted requirement is set to "True" in the testing repository. Setting a deleted flag associated with a requirement in the testing repository to true results in a "soft" delete at step 720 as opposed to a permanent or actual delete. That is, the requirement remains in the testing repository, but for the purposes of testing is considered to be non-existent.

Processing deleted requirements in such a manner allows a tester utilizing the testing application to "roll back" to, for example, a previous software release that originally contained the currently deleted requirements for further testing if desired. In addition, any audit trail logs and/or metrics can capture those requirements that have been deleted and the progression during the development life cycle of a piece of software can be seen. Also at step 720, any existing test plans that were mapped to the deleted requirements can be updated to forego testing of those deleted requirements.

Another aspect of the various embodiments of the present invention involves the ability to replicate requirements hierarchies as established in the requirements repository, and the ability to replicate any existing traceability between the requirements management application and the testing application. Hierarchical requirement relationships refer to relationships that reflect dependencies between different requirements of the same type. Hierarchical relationships can be one-to-one, one-to-many, and parent-child, and can be utilized to separate a larger and/or more generalized requirement into smaller and/or more explicit requirements. For example, a parent requirement can specify a software application to display customer information, where a related child requirement can direct the software application to specifically display the customer's name, address, and date of birth.

In order to replicate requirements hierarchies, the synchronization tool copies, for example, the parent-child relationship between packages and requirements from the requirements management application in addition to the actual requirements themselves. If any requirement is re-parented in the requirements management application, the synchronization tool has the ability to re-parent the copy of that requirement in its own the synchronization tool database 140. As well, if any requirement is deleted, for example, in the requirements repository, resulting in a deletion of additional child requirements, the appropriate parent and child requirements are "soft" deleted in the synchronization tool database 140. This hierarchy replication is achieved by tracking each requirement's GUID identifier. Because each GUM identifier is uniquely assigned to a requirement in the requirements management application, the requirement can easily be tracked and moved, i.e., re-parented, if necessary.

Traceability refers to a dependency relationship between two requirements, where traceability allows any changes to the requirements to be properly managed. As discussed above, various types of requirements can exist, and in addition, relationships between requirements can exist, where one or more requirement types can be the link between the requirements. For example, requirements that arise from a customer request are ultimately related to features in the end product that are developed to meet the requests. In turn, the features are related to specific requirements that embody the features in terms of, for example, functional behavior. Alternatively, a functional requirement may stem from or be derived from a background requirement. Therefore, such requirements can be linked using the traceability features of the requirements management application.

When the synchronization tool synchronizes one of those requirements, such as the functional requirement, the traceability link from the requirements management application is maintained in the testing application. As noted above, it is possible to create a traceability link between requirements of the same requirement type. It is also possible, however, to create a traceability link between requirements of different requirement types. In addition, traceability relationships can be created and maintained in a single requirements document, between different requirements documents, and simply between other requirements stored in the requirements repository. Maintaining the traceability link allows a tester to better appreciate the purpose of the functional requirement.

This better appreciation can be used to tailor test cases for the functional requirement in light of the background requirement. In addition, if for example, a policy requirement is associated with a plurality of functional requirements, a tester can ensure that the functional requirements he or she is supposed to test, for example, are those functional requirements that actually do get tested by checking the traceability of the functionality requirements to the policy requirement. It should be noted however, that requirements can be mutually exclusive unto themselves.

To allow replicating the traceability between requirements from the requirements management application to the testing application, the "trace-to" and the "trace-from" relationships identified in the requirements management application are replicated in the testing repository. The terms trace-to and trace-from refer to states of a particular requirement that has a traceability link associated with it. Referring to the example described above, the functional requirements that was derived from the background requirement can be thought of having a traceability relationship in which the functional requirement is traced from the background requirement. The background requirement on the other hand can be considered to be traced to the functional requirement.

It should be noted that both direct and indirect traceability relationships can be defined, where a direct traceability relationship refers to the previous example. An indirect traceability relationship would result, for example, if a scope requirement was traced to a background requirement and the background requirement was traced to a functional requirement, resulting in the functional requirement having an indirect traceability link to the scope requirement.

In addition, if any changes occur in the traceability of a requirement, those changes are also replicated. Furthermore, traceability data can be viewed and/or utilized to check "suspect" requirements. For example, if a requirement's name, metadata, type, or attribute is changed, the requirement may no longer belong to a particular parent requirement. The traceability data can reveal this change and as discussed above with regard to requirements hierarchies, the changed requirement can be re-parented.

Although traceability has been described above in relation to requirements, traceability can also be applicable to testing. For example, a changed requirement can affect the testing process related to that changed requirement, as discussed previously. As described above, additional information relevant to a particular requirement can be associated with the requirement and is retained during synchronization between the requirements repository and the testing repository. Therefore, if a user responsible for the changed requirement has suggestions or comments regarding how the changed requirement is to be tested, such information can be synchronized as well. This allows appropriate testing personnel to be notified of any relevant information regarding their tests, test plans, testing strategies, etc. for the changed requirement as well as any other requirement that has a traceability link with the changed requirement.

Folder structure can also be replicated during a synchronization from the requirements management application to the testing application. As described above, the requirements repository stores requirements according to a particular folder structure that relates to parent-child relationships between packages and requirements. If any requirement or package is re-parented to another package, for example, the synchronization tool can move the requirement or package at issue under the current/proper parent package. As with the requirements hierarchies described above, the unique GUID identifiers associated with each requirement is used to achieve this replication of folder structure.

Figure 8:
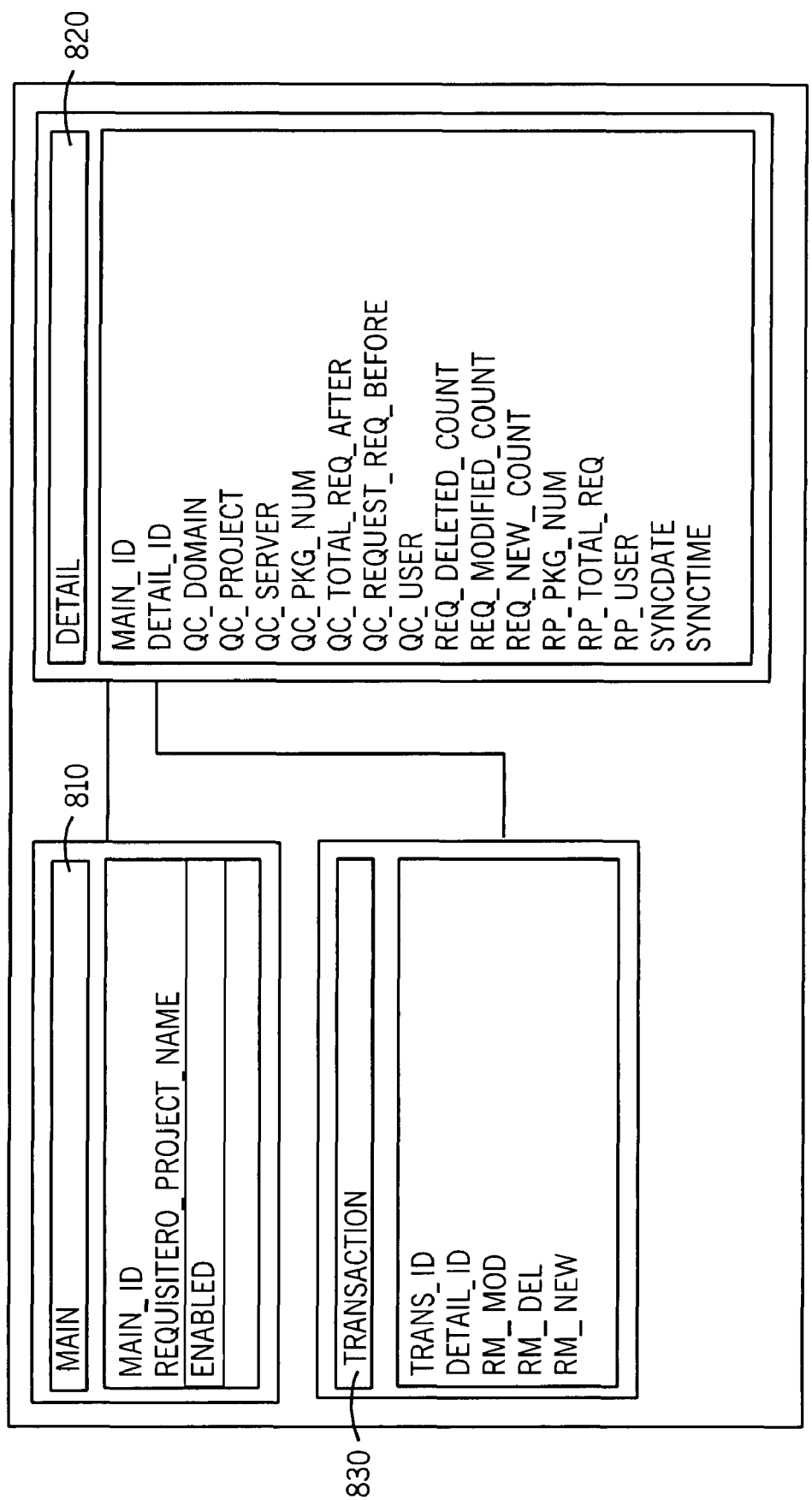
FIG. 8 shows a format of a relational database utilized in conjunction with the various embodiments of the present invention.

FIG. 8 illustrates an example of a relational database structure utilized in the synchronization tool database 140. Various tables are shown in which the various requirements, projects, metadata, etc. are stored, including synchronization tool MAIN table 810, synchronization tool DETAIL table 820, and synchronization tool TRANSACTION table 830. The synchronization tool MAIN table 810 has stored therein any registered requirements management application projects along with an option to enable or disable access to the table. The synchronization tool DETAIL table 820 contains all the audit trail log data described above for all synchronization instances. The synchronization tool TRANSACTION table 830 maintains records regarding any changes made to any of the requirements.

Figure 9:
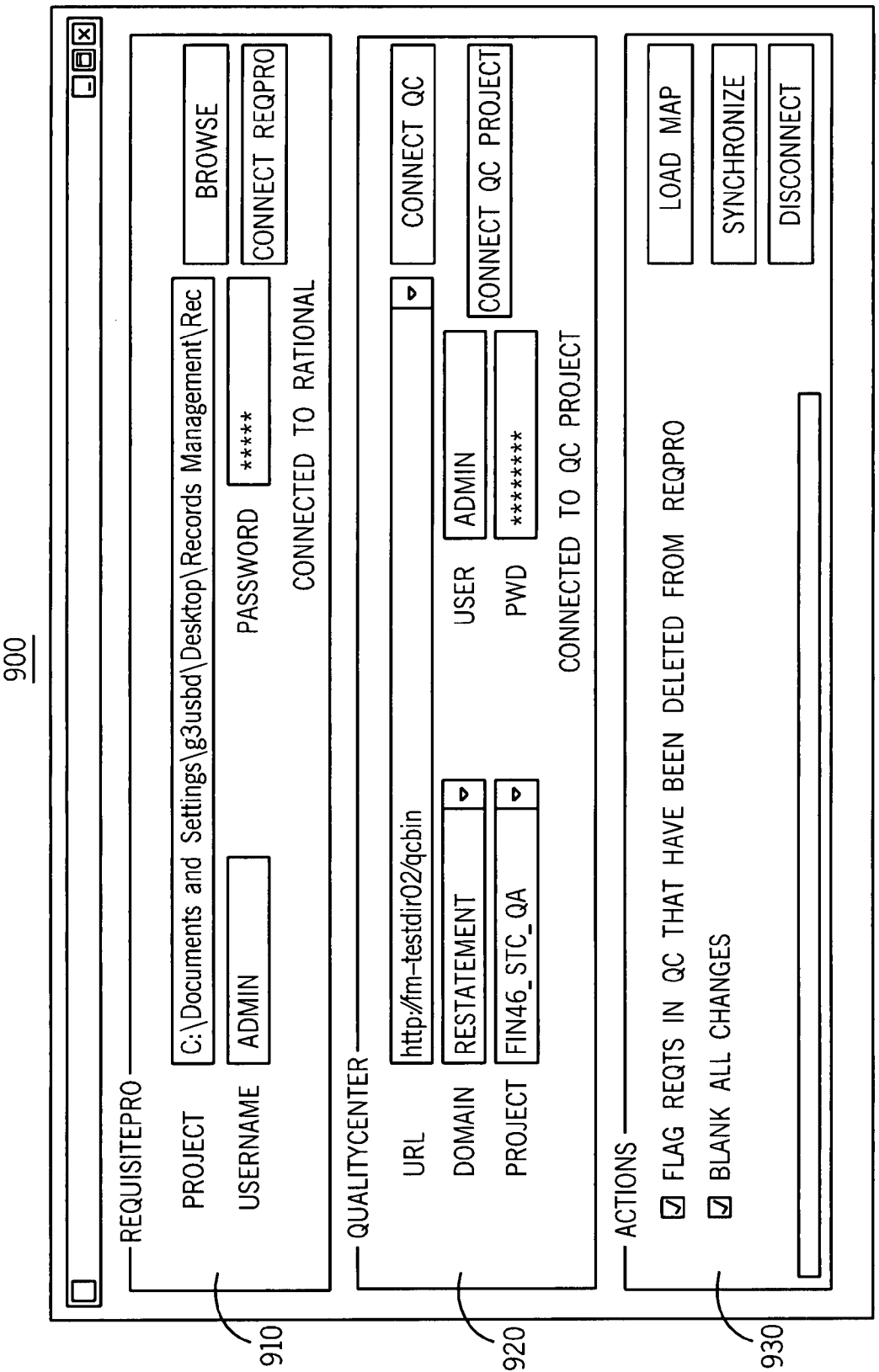
FIG. 9 illustrates an initial graphical user interface utilized in conjunction with the various embodiments of the present invention.

FIG. 9 shows an example of an initial synchronization tool graphical user interface (GUI) 900 that is presented to a synchronization tool user upon first accessing the synchronization tool, allowing him or her to specify and control synchronizations between the requirements repository and the testing repository. A first interface 910 shows a logon interface for connecting to the requirements repository through the synchronization tool, where the location of a project can be identified, as well as a username and a password. A second interface 920 shows a logon interface for connecting to the testing application via the synchronization tool, where a Uniform Resource Locator (URL) associated with a particular test project can be indicated, as well as a domain, project name, user, and password. A third interface indicates various actions or preferences that may be specified by the user regarding synchronization criteria and/or characteristics, such as the flagging of deleted requirements and the blanking of all changes, described above.

The various methods of customizing synchronization instances, and the system and method used to achieve synchronizations also provides distinct advantages regarding business and software development compliance requirements. The synchronization tool is able to determine, indicate, log, and transmit notifications regarding a plurality of important pieces of information related to the development process. The name or names of actual authors of requirements can be determined and displayed, which aids in SOX compliance, where any discrepancy between reported authors and those actually determined to be authors can create legitimacy questions. The ability to replicate and maintain hierarchies and traceability between requirements and packages also aids in SOX compliance by being able to certify that software features are related to their original specified requirements. This is especially useful in the development of financial and/or accounting type software.

It should be noted that all requirements management application users are registered in the various testing application projects before a synchronization instance can be initiated. Requirement version numbers, in addition to, for example, software release version numbers are maintained and can be displayed. Again, the use of version numbers ensures that the development of a system or software progresses using the correct requirements. Furthermore, the ability to customize the synchronization tool and the synchronization process allows specific requirements management and change-management processes of a particular corporation, test group, development group, etc. to be closely adhered to.

From a business process production perspective, various features can be realized using the various embodiments of the present invention described above. Throughout a development cycle of a system or software, it is often advantageous to perform "gap" analysis, where gap analysis refers to determining whether any gaps in the testing process have occurred. That is, analyzing testing results associated with a particular system or software, or a portion thereof, to determine if what is actually being or has actually been tested is commensurate with that should be or should have been tested can identify testing process deficiencies.

For example, a stakeholder can compare one or more audit trail logs and/or metrics generated by and/or received from the synchronization tool indicating changed requirements that were to be tested with a test report generated by the testing application and/or a particular tester, quality assurance personnel etc. If the test report shows that one or more of the changed requirements synchronized with the testing repository using the synchronization tool were not in fact tested, steps can be taken to continue testing or re-test the system or software.

In addition, processing a gap analysis in accordance with the various embodiments of the present invention can be accomplished in a short amount of time. The speed with which gap analyses can be completed results from the synchronization tool, the requirements management application, and the testing application each having their own requirements repositories to glean information from, where the requirements data is kept up to date from synchronizations, as well as the fact that metrics and audit trail logs are already created and managed after each synchronization.

Impact analysis is another feature that can be conveniently realized when utilizing the various embodiments of the present invention. Performing impact analyses provides a method of determining in what way, changed requirements and/or the addition or deletion of requirements affect a particular system or software product. For example, testing results can indicate that more defect were reported for a latest software release version than were reported for a previous software release version. Due to the fact that audit trail logs and metrics are kept for the synchronization tool synchronization instances, it can be determined that the addition of new requirements in the latest software release were the reason for the increase in defects. In addition, because of the traceability functionality provided in the synchronization tool, the requirements can be traced to a requirements source, for example, that could be deemed to be impractical or unworkable.

Furthermore, impact analysis results can influence the testing process in terms of how new test cases should be developed and whether or existing test cases should be updated or left the same. For example, it is possible to have a situation where an increase in defect reports are a result of current tests and test strategies not correctly determining the impact of new or changed requirements to a system or software product, as opposed to issues related to the introduction of the new or changed requirements. Performing impact analysis can identify such a situation, whereupon measures can be taken to adjust, rework, and/or develop new tests and test strategies for the changed or new requirements.

In addition, the ability to filter requirements as described above can be utilized by system and software developers, requirements entities, and/or business development teams, etc. to push down only those requirements deemed necessary for testing. It is very feasible to have thousands of requirements simultaneously existing in the requirements repository, where the requirements are related to a plurality of different systems or software release versions. Synchronizing only those requirements relevant to, for example, a single software release version streamlines the development, testing, and rollout process, as well as provides an effective method of controlling and managing the testing process.

It will be further appreciated that system and method described herein may perform fewer or additional functions as compared to those described herein. For example, an entity (e.g., a lending institution) that performs and/or utilizes only some of the above-mentioned processes may use a computer system that contains only a subset of the functions described herein. Additionally, one or more of the systems or functions described above may be variously combined in alternative configurations.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A method, executed by a central processing unit operatively connected to a memory unit, of maintaining traceability between at least two requirements, comprising:
   receiving data associated with one or more requirements from a computer-implemented requirements management application, the data stored in a requirements repository of the requirements management application;
   storing the received data associated with the one or more requirements in a synchronization tool database;
   determining a first requirement from the one or more requirements using one or more filters stored in a configuration file, the one or more filters specifying one or more requirement attributes and corresponding requirement attribute values;
   updating a testing repository of a testing application with the first requirement via a synchronization process performed between the requirements repository and the testing repository; and
   replicating at least one traceability relationship between the first requirement and a second requirement during the synchronization process at the testing repository.

2. The method of claim 1, wherein the at least one traceability requirement can be one of either a trace-to relationship and a trace-from relationship.

3. The method of claim 2, wherein the trace-to and the trace-from relationships are maintained in the testing repository.

4. The method of claim 2, wherein the trace-to relationship describes a requirements state indicating that the first requirement has a dependency to the second requirement.

5. The method of claim 2, wherein the trace-from relationship describes a requirements state indicating that the second requirement has a dependency from the first requirement.

6. The method of claim 2, wherein the first requirement is associated with both a trace-to relationship and a trace-from relationship.

7. The method of claim 2, wherein the at least one traceability relationship is one of either a direct relationship or an indirect relationship linking the first and second requirements.

8. The method of claim 7, wherein the direct relationship linking the first and second requirements comprises a requirements state including at least one of either the trace-to relationship and the trace-from relationship between the first and second requirements.

9. The method of claim 7, wherein the indirect relationship linking the first and second requirements comprises a requirements state including at least one of either a first trace-to relationship and a first trace-from relationship between the first requirement and a third requirement, and at least one of either a second trace-to relationship and a second trace-from relationship between the third requirement and the second requirement.

10. The method of claim 1, wherein the first requirement and the second requirement comprise requirements of one of either a same type and a different type.

11. The method of claim 1 further comprising, maintaining the at least one traceability relationship between the first and second requirements in compliance with Sarbanes-Oxley (SOX) governance requirements.

12. The method of claim 1, wherein the at least one traceability relationship is maintained in at least one of either a single requirements document, at least two different requirements documents, and the testing repository.

13. The method of claim 1, wherein a first testing process associated with the first requirement is modified in accordance with a second testing process associated with a second relationship upon identification of the at least one traceability relationship associated with the first and second requirements.

14. The method of claim 1 further comprising, replicating a change to the at least one traceability relationship between the first and second requirements during the synchronization process at the least one testing repository.

15. The method of claim 14 further comprising, checking the at least one traceability relationship after the change to the at least one traceability relationship is replicated in order to determine whether additional data associated with at least one of either the first and second requirements is no longer valid.

16. A system for maintaining traceability between at least two requirements, comprising:
   a memory unit; and
   a processing unit operatively connected to the memory unit and including:
      computer code for receiving data associated with one or more requirements from a computer-implemented requirements management application, the data stored in a requirements repository of the requirements management application;
      computer code for storing the received data associated with the one or more requirements in a synchronization tool database;
      computer code for determining a first requirement from the one or more requirements using one or more filters stored in a configuration file, the one or more filters specifying one or more requirement attributes and corresponding requirement attribute values;
      computer code for updating a testing repository of a testing application with the first requirement via a synchronization process performed between the at least one requirements repository and the at least one testing repository; and
      computer code for replicating at least one traceability relationship between the first requirement and a second requirement during the synchronization process at the testing repository.

17. The system of claim 16, wherein the at least one traceability requirement can be one of either a trace-to relationship and a trace-from relationship.

18. The system of claim 17, wherein the processing unit further comprises computer code for maintaining the trace-to and the trace-from relationships in the testing repository.

19. The system of claim 16, wherein the trace-to relationship describes a requirements state indicating that the first requirement has a dependency to a second requirement.

20. The system of claim 16, wherein the trace-from relationship describes a requirements state indicating that the second requirement has a dependency from the first requirement.

21. The system of claim 16, wherein the first requirement is associated with both a trace-to relationship and a trace-from relationship.

22. The system of claim 16, wherein the at least one traceability relationship is one of either a direct relationship or an indirect relationship linking the first and second requirements.

23. The system of claim 22, wherein the direct relationship linking the first and second requirements comprises a requirements state including at least one of either the trace-to relationship and the trace-from relationship between the first and second requirements.

24. The system of claim 22, wherein the indirect relationship linking the first and second requirements comprises a requirements state including at least one of either a first trace-to relationship and a first trace-from relationship between the first requirement and a third requirement, and at least one of either a second trace-to relationship and a second trace-from relationship between the third requirement and the second requirement.

25. The system of claim 16, wherein the first requirement and the second requirement comprise requirements of one of either a same type and a different type.

26. The system of claim 16, wherein the processing unit further comprises computer code for, maintaining the at least one traceability relationship between the first and second requirements in compliance with SOX governance requirements.

27. The system of claim 16, wherein the processing unit further comprises computer code for, maintaining the at least one traceability relationship in at least one of either a single requirements document, at least two different requirements documents, and the testing repository.

28. The system of claim 16, wherein the processing unit further comprises computer code for, modifying a first testing process associated with the first requirement in accordance with a second testing process associated with the second relationship upon identification of the at least one traceability relationship associated with the first and second requirements.

29. The system of claim 16, wherein the processing unit further comprises computer code for, replicating a change to the at least one traceability relationship between the first and second requirements during the synchronization process at the testing repository.

30. The system of claim 29, wherein the processing unit further comprises computer code for, checking the at least one traceability relationship after the change to the at least one traceability relationship is replicated in order to determine whether additional data associated with at least one of either the first and second requirements is no longer valid.

* * * * *